US010534760B1

United States Patent
Ugur-Ozekinci et al.

(10) Patent No.: US 10,534,760 B1
(45) Date of Patent: Jan. 14, 2020

(54) METHOD AND SYSTEM FOR RETRIEVING BACKUP PARAMETERS FOR RECOVERY

(71) Applicant: EMC Corporation, Hopkinton, MA (US)

(72) Inventors: Yasemin Ugur-Ozekinci, Oakville (CA); Vladimir Mandic, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 174 days.

(21) Appl. No.: 13/905,746

(22) Filed: May 30, 2013

(51) Int. Cl.
*G06F 16/21* (2019.01)

(52) U.S. Cl.
CPC .................................. *G06F 16/21* (2019.01)

(58) Field of Classification Search
CPC ........... G06F 17/30067; G06F 11/2028; G06F 11/1451; G06F 3/067; G06F 11/458; G06F 11/1464; G06F 11/1471; G06F 17/30008; G06F 11/1458; G06F 11/1471; G06F 3/065; G06F 16/21
See application file for complete search history.

(56) References Cited

U.S. PATENT DOCUMENTS

| | | | |
|---|---|---|---|
| 5,664,186 A * | 9/1997 | Bennett et al. | |
| 7,987,325 B1 * | 7/2011 | Patil | G06F 11/1448 711/161 |
| 8,195,612 B1 * | 6/2012 | Nagarkar et al. | 707/644 |
| 9,128,627 B1 * | 9/2015 | Bachu | G06F 11/1456 |
| 9,158,763 B1 * | 10/2015 | Singhal | G06F 17/30 |
| 2004/0139128 A1 * | 7/2004 | Becker | G06F 11/1456 |
| 2005/0273476 A1 * | 12/2005 | Wertheimer et al. | 707/204 |
| 2006/0047720 A1 * | 3/2006 | Kulkarni | G06F 11/1458 |
| 2009/0106327 A1 * | 4/2009 | Dilman et al. | 707/202 |
| 2010/0250499 A1 * | 9/2010 | McAlister | G06F 11/1451 707/679 |
| 2013/0282662 A1 * | 10/2013 | Kumarasamy | G06F 11/14 707/649 |
| 2014/0006858 A1 * | 1/2014 | Helfman | G06F 11/1448 714/19 |

* cited by examiner

*Primary Examiner* — Mariela Reyes
*Assistant Examiner* — Courtney Harmon
(74) *Attorney, Agent, or Firm* — Dergosits & Noah LLP; Todd A. Noah

(57) ABSTRACT

Retrieving backup parameters for recovery is described. A clone copy is created of a backup file stored on a disk. The clone copy is stored on an external destination node including an external disk and/or a tape. Backup parameters are stored to a backup catalog. The backup parameters identify a location of the clone copy. A request is received to recover the clone copy. The backup parameters are retrieved from the backup catalog. The clone copy is recovered from the external destination node based on the backup parameters. The clone copy is restored to a database associated with the backup file.

20 Claims, 3 Drawing Sheets

METHOD AND SYSTEM FOR RETRIEVING BACKUP PARAMETERS FOR RECOVERY

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore a copy of the corresponding backup files for that state to the database. An additional copy that is made of the copy of the backup files and stored separately from the backup files may be referred to as a clone copy of the backup files.

A relational database management system, such as Oracle®, SQL® database, IBM® DB2® database, or any other type of relational database, typically use the relational database management system's native backup and recovery tool to store a backup file to a file system directory (called a recovery area directory) on a disk, and then create and store a clone copy of the backup file using a one-step backup process or a two-step backup process. In the one-step backup process, a database administrator for the relational database management system and a backup administrator for a third-party backup application together create and store the clone copy of the backup file directly to a backup device that is external to the relational database management system. The third-party backup application typically has a plugin for the relational database management system. The relational database management system sends a clone copy of the backup file directly to the plugin using a well-defined application program interface, and in turn to the external backup device. In the two-step backup process, the database administrator uses the relational database management system's native backup and recovery tool to store the backup file to a file system directory (recovery area directory) on a disk without using any third-party backup application, and then requests the backup administrator to use the third-party backup application to store a clone copy of the backup file to the external backup device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Regardless of whether the one-step backup process or the two-step backup process is used to clone a copy of the backup file, the database administrator typically performs the restore process. However, the database administrator has to provide backup parameters specific to the third-party backup application at the recovery time so that the third-party backup application can locate the requested clone copy or copies. Although database administrators may be very familiar about the specifics of relational database management systems, database administrators generally do not know and do not want to learn about third-party backup applications. The database administrator may not even know or remember what backup parameters were used for the clone copies created and stored relatively recently, such as two months ago. Furthermore, the backup administrator may have changed the backup server that stores the requested clone copy without letting the database administrator know about the change.

Embodiments herein enable retrieving backup parameters for recovery. A clone copy is created of a backup file stored on a disk. For example, a backup application creates a clone copy of an incremental backup copy stored on a disk. The clone copy is stored on an external destination node including an external disk and/or a tape. For example, the backup application stores the clone copy on an external disk. Backup parameters are stored to a backup catalog, wherein the backup parameters identify a location of the clone copy. For example, the backup application stores the backup parameters, which identify the location of the clone copy on the external disk, to a backup catalog. A request is received to recover the clone copy. For example, the backup application receives a request from a backup and recovery tool to recovery the clone copy stored on the external disk. The backup parameters are retrieved from the backup catalog. For example, the backup application retrieves the backup parameters, which identify the location of the clone copy on the external disk, from the backup catalog. The clone copy is recovered from the external destination node based on the backup parameters. For example, the backup application recovers the clone copy from the external disk based on the backup parameters that identify the location of the clone copy. The clone copy is restored to a database associated with the backup file. For example, the backup application sends the clone copy to the backup and recovery tool to restore the clone copy to a corrupted relational database. The database administrator does not know and does not have to provide backup parameters specific to the third-party backup application.

Figure 1:
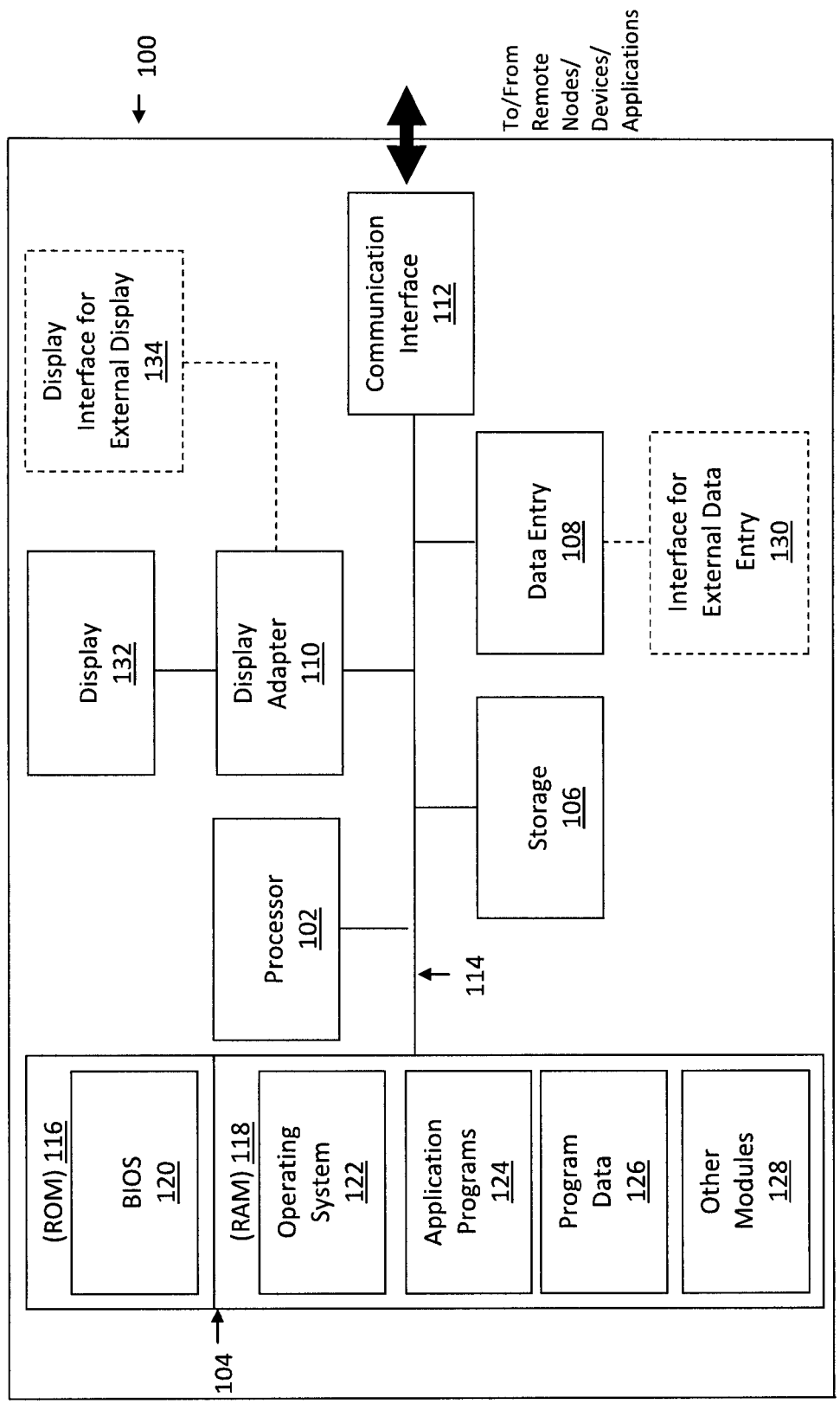
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for retrieving backup parameters for recovery.

Generally, database administrators do not want to learn about third-party backup applications. Embodiments herein retrieve backup parameters for recovery. A database administrator does not know and does not have to provide backup parameters specific to a third-party backup application.

Figure 2:
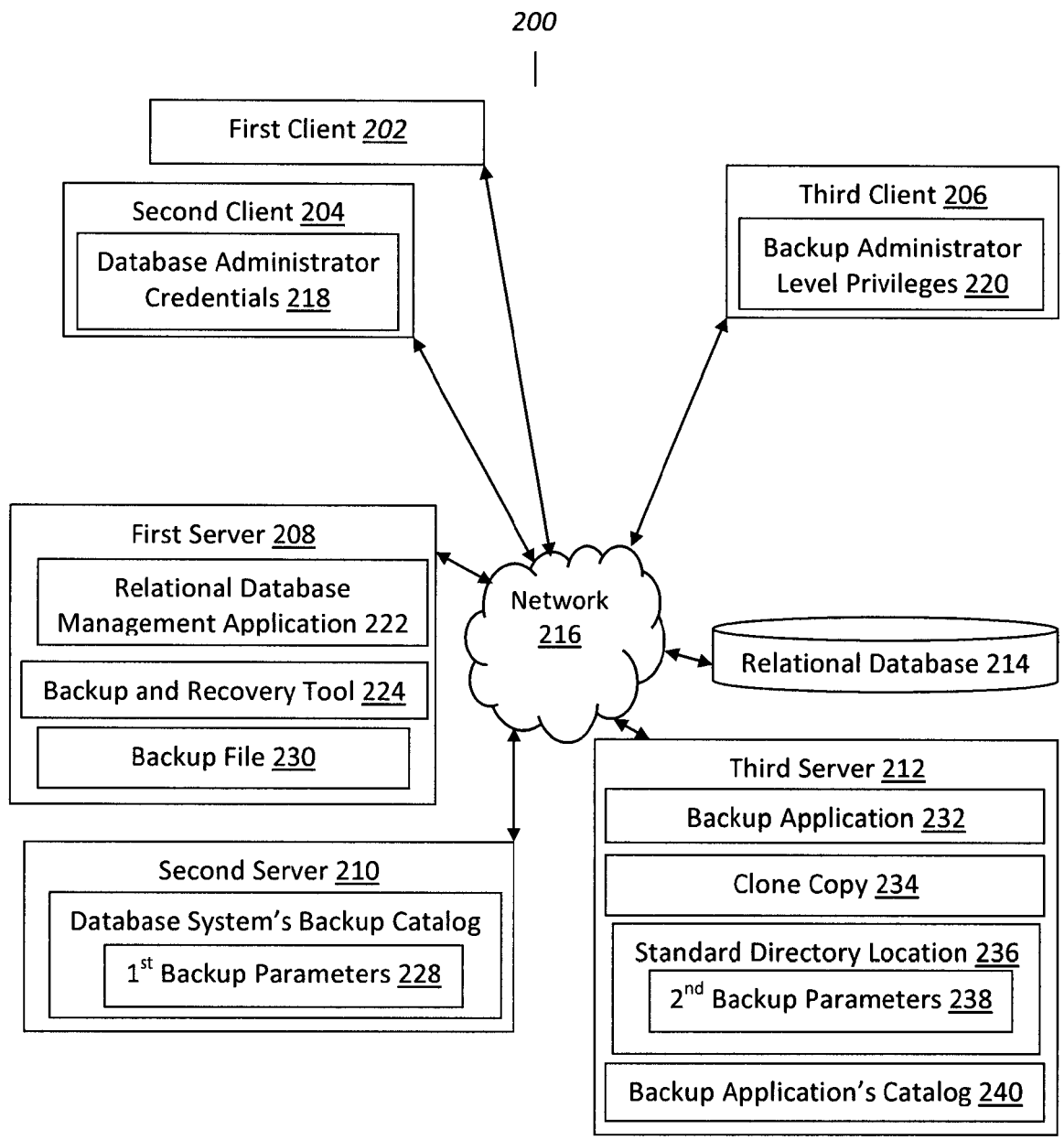
FIG. 2 illustrates a block diagram of an example system for retrieving backup parameters for recovery, under an embodiment.

FIG. 2 illustrates a block diagram of a system that retrieves backup parameters for recovery, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, and a third server 212, that are provided by a hosting company. The first server 208 is associated with a relational database 214. The clients 202-206, the servers 208-212, and the relational database 214 communicate via a network 216. Although FIG. 2 depicts the system 200 with three clients 202-206, three servers 208-212, one relational database 214, and one network 216, the system 200 may include any number of clients 202-206, servers 208-212, relational databases 214, and networks 216. The clients 202-206 and the servers 208-212 may each be substantially similar to the system 100 depicted in FIG. 1.

The first client 202 enables a user to access a relation database management system as a system user. The second client 204 includes database administrator credentials 218 that enable a user to access the relation database management system as a database administrator. The third client 206 includes backup administrator level privileges 220 that enable a user to access a third-party backup application as a backup administrator. The first server 208 includes a relational database management application 222 that executes to implement the relation database management system, a backup and recovery tool 224 that manages backup and recovery for the relational database 214, and a backup file 230 that may be an image copy of data files or a proprietary format file that includes parts or all of multiple data files. The second server 210 includes a database system's backup catalog 226 that records activity of the backup and recovery tool 224 for at least one relational database 214. The database system's backup catalog 226 stores the primary copy of the backup parameters 228 related to backup and recovery. The third server 212 includes a backup application 232 that creates and recovers a clone copy 234 of the backup file 230. The third server 212 also includes a standard directory location 236, where a secondary copy of the backup parameters 238 is stored, and a backup application's catalog 240.

FIG. 2 depicts the system elements 222, 224, and 230 residing completely on the first server 208 and the system elements 232-240 residing completely on the third server 212. However, the system elements 222, 224, and 230 may reside in any combination of partially on the first server 208 and partially on other servers that are not depicted in FIG. 2. Similarly, the system elements 232-240 may reside in any combination of partially on the third server 212 and partially on other servers that are not depicted in FIG. 2.

After the database administrator uses the backup and recovery tool 224 to create the backup file 230 for the relational database 214, and store the backup file 230 on a disk associated with the second server 220, the backup application 232, such as a NetWorker® backup application, creates the clone copy 234 of the backup file 230. For example, the backup application 232 creates the clone copy 234 of an incremental backup copy 230 of changes to human resources data stored in the relational database 214. The clone copy 234 may be the full backup file 230 or the incremental backup file 230.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Oracle. Client backup data can be sent to a remote NetWorker® storage node or stored on a locally attached device by the use of a dedicated storage node. EMC Corporation's NetWorker® modules for Databases and Applications supports cross platforms products such as Oracle, IBM and DB2 servers.

The backup application 232 stores the clone copy 234 on an external destination node including an external disk and/or a tape. For example, the backup application 232 stores the clone copy 234 on a disk associated with the third server 212, thereby protecting the clone copy 234 of the incremental backup file 230 even if the relational database 214 and/or the incremental backup file 230 stored on a disk associated with the second server 210 is corrupted. The external destination node, such as the third server 212, may include multiple destination nodes, and the multiple destination nodes may include a disk destination node, a tape destination node, and/or a destination node that is a combination of disks and tapes. For example, the backup application 232 may store the clone copy 234 on a disk, on a tape, or partly on a disk and partly on a tape associated with the third server 212. A backup administrator may access the backup application 232 via the third client 206 to specify a priority for storing the clone copy 234 on the external destination nodes, such as storing only on disks, or storing on disks before storing on a combination of disks and tapes. Additionally, a backup administrator may use the backup application 232 to specify the options for the clone copy 234 to be encrypted, deduplicated, and/or compressed while being transmitted from a source, and the options for clone copy 234 to be decrypted and/or decompressed when stored on an external destination node. Data deduplication significantly reduces cloning time by only storing unique daily changes, while always maintaining daily clone copies of full backup files for an immediate single-step restore. The transmission of deduplicated clone copies sends only changed blocks, thereby reducing network traffic.

During the backup, the backup application 232 stores the primary copy of the backup parameters 228 to the database system's backup catalog 226, wherein the primary copy of the backup parameters 228 identify the location of the clone copy 234. For example, the backup application 232 stores the primary copy of the backup parameters 228, which identify the location of the clone copy 234 on the disk associated with the third server 212, to the database system's backup catalog 226. The primary copy of the backup parameters 228 may also identify a location of the relational database associated 214 with the backup file 230. The backup application 232 may also store the secondary copy of the backup parameters 238 to a file in the standard directory location 236 associated with a storage device. For example, the backup application 232 stores the secondary copy of the backup parameters 238, which identify the location of the clone copy 234 on a disk associated with the third server 212, to the standard directory location 236. Since the backup setting may change from one cloning instance to another cloning instance, the standard directory location 236 may store multiple versions of the secondary copy of the backup parameters 238.

The backup application 232 may periodically monitor whether the clone copy 234 is moved from one location to an alternative location. For example, the backup application 232 determines whether the clone copy 234 is moved from its original location on a disk associated with the third server 212 to an alternative location, which may be associated with the third server 212 or with another storage device. If the clone copy 234 is moved, the backup application 232 may store the updated primary copy of the backup parameters 228 to the database system's backup catalog 226 and may store the updated secondary copy of the backup parameters 238 to the standard directory location 236 associated with a storage device. For example, the backup application 232 stores the primary copy of the backup parameters 228, which identify the new location of the clone copy 234, to the database system's backup catalog 226, and stores the secondary copy of the backup parameters 238, which identify the new location of the clone copy 234, to the standard directory location 236.

The backup application 232 receives a request to recover the clone copy 234. For example, the backup application 232 receives a request from the backup and recovery tool 224 to recover the clone copy 234 stored on a disk associated with the third server 212. The backup application 232 may determine whether the primary copy of the backup parameters 228 is absent from the database system's backup catalog 226. If the primary copy of the backup parameters 228 is not absent from the database system's backup catalog 226, the backup application 232 retrieves the primary copy of the backup parameters 228 from the database system's backup catalog 226. For example, the backup application 232 retrieves the primary copy of the backup parameters 228, which identifies the location of the clone copy 234 on a disk associated with the third server 212, from the database system's backup catalog 226. If the primary copy of the backup parameters 228 is absent from the database system's backup catalog 226, the backup application 232 retrieves the secondary copy of the backup parameters 238 from the standard directory location 236. For example, the backup application 232 retrieves the secondary copy of the backup parameters 238, which identifies the location of the clone copy 234 on a disk associated with the third server 212, from the standard directory location 236. Since the standard directory location 236 may store multiple versions of the secondary copy of the backup parameters 238, the backup application 232 may try each version of the secondary copy of the backup parameters 238 that are in the standard directory location 236, from the most recently stored version to the least recently stored version, until the backup application 232 can recover the clone copy 234 from the external destination node.

The backup application 232 recovers the clone copy 234 from the external destination node based on the backup parameters. For example, the backup application 232 recovers the clone copy 234 from the disk associated with the third server 212 based on the primary copy of the backup parameters 228, which identify the location of the clone copy 234 on a disk associated with the third server 212. The backup application 232 enables the backup and recovery tool 224 to restore the recovered clone copy 234 to the relational database 214. For example, the backup application 232 sends the recovered clone copy 234 to the backup and recovery tool 224 to restore the corrupted relational database 214. The backup application 232 may enable the backup and recovery tool 224 to restore the recovered clone copy 234 to the relational database 214 by using automatic channel settings.

Below is a prior art script example of specific backup parameter settings that a database administrator has to provide to the NetWorker® backup application for recovery:

```
run {
  allocate channel c1 device type SBT;
  send 'NSR_ENV=(NSR_SERVER=bu-rocky.lss.emc-
    .com, NSR_CLIENT=bu-star1.lss.emc.com)';
  RESTORE DATABASE;
  RECOVER DATABASE;
}
```

Below is a more simplified script example that the backup application 232 enables a database administrator provides to the NetWorker® backup application:

run {
RESTORE DATABASE;
RECOVER DATABASE;
}

Due to the backup application 232, a database administrator does not need to allocate channels and set specific parameters for the NetWorker® backup application. A database administrator may also select to execute a manual rollback to restore the relational database 214 based on a certain checkpoint selected by the database administrator.

The backup and recovery tool 224 may typically select to restore the relational database 214 from the backup file 230 stored on the disk associated with the second server 210. However, if the backup and recovery tool 224 determines that the backup file 230 stored on the disk associated with the second server 210 is corrupted or absent, the backup and recovery tool 224 requests to recover the clone copy 234 from the disk associated with the third server 212 based on the primary copy of the backup parameters 228 or the secondary copy of the backup parameters 238, and restores the clone copy 234 to the corrupted relational database 214. Even if the backup and recovery tool 224 requests to recover the clone copy 234 from the disk associated with the third server 212, a database administrator requesting the recovery via the second client 204 participates in a single step recovery process, as the database administrator does not have to request assistance from the backup administrator, or request the separate loading of any storage medium used for long-term data retention, such as a tape storage. The database administrator does not know and does not have to provide the any backup parameters specific to a third-party backup application.

Figure 3:
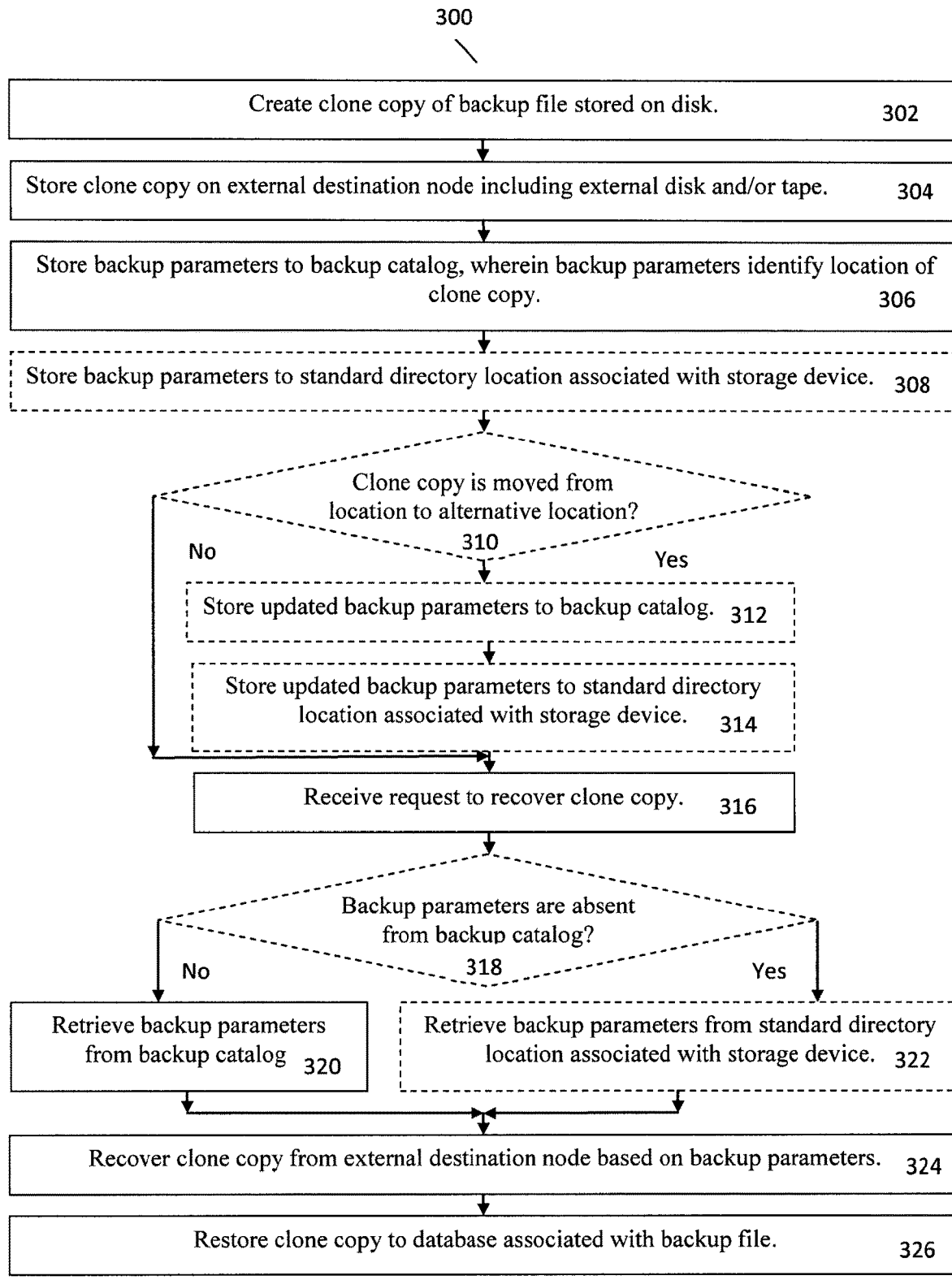
FIG. 3 is a flowchart that illustrates a method of retrieving backup parameters for recovery, under an embodiment.

FIG. 3 is a flowchart that illustrates a method of retrieving backup parameters for recovery. Flowchart 300 illustrates method acts illustrated as flowchart blocks for certain steps involved in and/or between the clients 202-206 and/or the servers 208-212 of FIG. 2.

A clone copy is created of the backup file stored on a disk, act 302. For example, the backup application 232 creates the clone copy 234 of the incremental backup copy 238 stored on a disk associated with the second server 210.

The clone copy is stored on an external destination node including an external disk and/or a tape, act 304. For example, the backup application 232 stores the clone copy 234 on a disk associated with the third server 212.

Backup parameters are stored to a backup catalog, wherein the backup parameters identify a location of a clone copy, act 306. For example, the backup application 232 stores the primary copy of the backup parameters 228, which identify the location of the clone copy 234 on the disk associated with the third server 212, to the database system's backup catalog 226.

Backup parameters are optionally stored to a standard directory location associated with a storage device, act 308. For example, the backup application 232 stores the secondary copy of the backup parameters 238, which identify the location of the clone copy 234 on a disk associated with the third server 212, to the standard directory location 236.

A determination is optionally made whether a clone copy is moved from one location to an alternative location, act 310. For example, the backup application 232 determines whether the clone copy 234 is moved from its original location on a disk associated with the third server 212 to an alternative location, which may be associated with the third server 212 or with another storage device. If the clone copy is moved from one location to an alternative location, the flowchart 300 continues to act 312. If the clone copy is not moved from one location to an alternative location, the flowchart 300 proceeds to act 316.

Updated backup parameters are optionally stored to a backup catalog, act 312. For example, the backup application 232 stores the primary copy of the backup parameters 228, which identify the new location of the clone copy 234, to the database system's backup catalog 226.

Updated backup parameters are optionally to a standard directory location associated with a storage device, act 314. For example, the backup application 232 stores the secondary copy of the backup parameters 238, which identify the new location of the clone copy 234, to the standard directory location 236.

A request is received to recover the clone copy, act 316. For example, the backup application receives a request from the backup and recovery tool 224 to recover the clone copy 234 stored on a disk associated with the third server 212.

A determination is made whether backup parameters are absent from a backup catalog, act 318. For example, the backup application 232 determines whether the primary copy of the backup parameters 228 is absent from the database system's backup catalog 226. If backup parameters are not absent from a database system's backup catalog, the flowchart 300 continues to act 320. If backup parameters are absent from a backup catalog, the flowchart 300 proceeds to act 322.

The backup parameters are optionally retrieved from a backup catalog, act 320. For example, the backup application 232 retrieves the primary copy of the backup parameters 228, which identifies the location of the clone copy 234 on a disk associated with the third server 212, from the database system's backup catalog 226. Then the flowchart 300 proceeds to act 324.

Backup parameters are optionally retrieved from a standard directory location associated with a storage device, act 322. For example, the backup application 232 retrieves the secondary copy of the backup parameters 238, which identify the location of the clone copy 234 on a disk associated with the third server 212, from the standard directory location 236.

The clone copy is recovered from the external destination node based on the backup parameters, act 324. For example, the backup application 232 recovers the clone copy 234 from the disk associated with the third server 212 based on the primary copy of the backup parameters 228 that identify the location of the clone copy 234 on a disk associated with the third server 212.

The clone copy is restored to a database associated with the backup file, act 326. For example, the backup application 232 sends the clone copy 234 to the backup and recovery tool 224 to restore the clone copy 234 to the corrupted relational database 214.

Although FIG. 3 depicts the acts 302-326 occurring in a specific order, the acts 302-326 may occur in another order. Executing the flowchart 300 retrieves backup parameters for recovery. The database administrator does not know and does not have to provide any backup parameters specific to a third-party backup application.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for retrieving backup parameters for recovery, the system comprising:
   a processor-based third-party backup application executed on a first server and configured to:
   create, by the third-party backup application executed on the first server, a clone copy of a backup file stored on a disk associated with a second server, the backup file being a copy of a database state of a database, the backup file being created by a backup tool that is native to a third server of a database management system;
   store, by the third-party backup application, the clone copy on an external destination node comprising at least one of an external disk and a tape associated with the first server;
   store, by the third-party backup application, a primary copy of backup parameters to a backup catalog stored on the second server and a secondary copy of the backup parameters on the first server, wherein the backup parameters identify a location of the clone copy, the backup catalog only being associated with the database;
   receive, by the third-party backup application, a request from the backup tool that is native to the third server of the database management system to recover the clone copy from the external destination node, the backup tool requesting the clone copy of the backup file after determining the backup file stored on the server is corrupt or absent;
   retrieve, by the third-party backup application, in response to receiving the request from the backup tool, the primary copy of the backup parameters from the backup catalog stored on the second server;
   recover, by the third-party backup application, the clone copy from the external destination node based on the backup parameters; and
   provide, by the third-party backup application, the clone copy to the backup tool, the backup tool restoring the clone copy of the backup file to a corrupted database associated with the backup file.

2. The system of claim 1, wherein the processor-based third-party backup application is further configured to store the secondary copy of the backup parameters to a standard directory location on the first server.

3. The system of claim 2, wherein the processor-based third-party backup application is further configured to:
   determine whether the primary copy of the backup parameters are absent from the backup catalog; and
   retrieve the secondary copy of the backup parameters from the standard directory location on the first server in response to a determination that the backup parameters are absent from the backup catalog.

4. The system of claim 3, wherein retrieving the secondary copy of the backup parameters from the standard directory location comprises using backup parameters that are most recently stored in the standard directory location and untried at recovering the clone copy to recover the clone copy from the external destination node.

5. The system of claim 1, wherein the processor-based third-party backup application is further configured to:
   determine whether the clone copy is moved from the location to an alternative location; and
   store a primary copy of the updated backup parameters to the backup catalog in response to a determination that the clone copy is moved from the location to an alternative location.

6. The system of claim 5, wherein the processor-based third-party backup application is further configured to store a secondary copy of the updated backup parameters to a standard directory location.

7. The system of claim 1, wherein providing, by the third-party backup application, the clone copy to the backup tool comprises using automatic channel settings to restore the clone copy to the database associated with the backup file; and wherein the backup parameters further identify a location of the database associated with the backup copy.

8. A computer-implemented method for retrieving backup parameters for recovery, the method comprising:
   creating, by the third-party backup application executed on the first server, a clone copy of a backup file stored on a disk associated with a second server, the backup file being a copy of a database state of a database, the backup file being created by a backup tool that is native to a third server of a database management system;
   storing, by the third-party backup application, the clone copy on an external destination node comprising at least one of an external disk and a tape associated with the first server;
   storing, by the third-party backup application, a primary copy of backup parameters to a backup catalog stored on the second server and a secondary copy of the backup parameters on the first server, wherein the backup parameters identify a location of the clone copy, the backup catalog only being associated with the database;
   receiving, by the third-party backup application, a request from the backup tool that is native to the third server of the database management system to recover the clone copy from the external destination node, the backup tool requesting the clone copy of the backup file after determining the backup file stored on the server is corrupt or absent;

retrieving, by the third-party backup application, in response to receiving the request from the backup tool, the primary copy of the backup parameters from the backup catalog stored on the second server;

recovering, by the third-party backup application, the clone copy from the external destination node based on the backup parameters; and providing, by the third-party backup application, the clone copy to the backup tool, the backup tool restoring the clone copy of the backup file to a corrupted database associated with the backup file.

9. The method of claim 8, wherein the method further comprises storing the secondary copy of the backup parameters to a standard directory location on the first server.

10. The method of claim 9, wherein the method further comprises:
determining whether the primary copy of the backup parameters are absent from the backup catalog; and
retrieving the secondary copy of the backup parameters from the standard directory location on the first server in response to a determination that the backup parameters are absent from the backup catalog.

11. The method of claim 10, wherein retrieving the secondary copy of the backup parameters from the standard directory location comprises using backup parameters that are most recently stored in the standard directory location and untried at recovering the clone copy to recover the clone copy from the external destination node.

12. The method of claim 8, wherein the method further comprises:
determining whether the clone copy is moved from the location to an alternative location; and
storing a primary copy of the updated backup parameters to the backup catalog in response to a determination that the clone copy is moved from the location to an alternative location.

13. The method of claim 12, wherein the method further comprises storing a secondary copy of the updated backup parameters to a standard directory location.

14. The method of claim 8, wherein providing, by the third-party backup application, the clone copy to the backup tool comprises using automatic channel settings to restore the clone copy to the database associated with the backup file; and wherein the backup parameters further identify a location of the database associated with the backup copy.

15. A computer program product, comprising a non-transitory computer-readable medium having a computer-readable program code embodied therein, the computer-readable program code adapted to be executed by one or more processors to implement a method for retrieving backup parameters for recovery, the method comprising:
creating, by the third-party backup application executed on the first server, a clone copy of a backup file stored on a disk associated with a second server, the backup file being a copy of a database state of a database, the backup file being created by a backup tool that is native to a third server of a database management system;
storing, by the third-party backup application, the clone copy on an external destination node comprising at least one of an external disk and a tape associated with the first server;
storing, by the third-party backup application, a primary copy of backup parameters to a backup catalog stored on the second server and a secondary copy of the backup parameters on the first server, wherein the backup parameters identify a location of the clone copy, the backup catalog only being associated with the database;
receiving, by the third-party backup application, a request from the backup tool that is native to the third server of the database management system to recover the clone copy from the external destination node, the backup tool requesting the clone copy of the backup file after determining the backup file stored on the server is corrupt or absent;
retrieving, by the third-party backup application, in response to receiving the request from the backup tool, the primary copy of the backup parameters from the backup catalog stored on the second server;
recovering, by the third-party backup application, the clone copy from the external destination node based on the backup parameters; and
providing, by the third-party backup application, the clone copy to the backup tool, the backup tool restoring the clone copy of the backup file to a corrupted database associated with the backup file.

16. The computer program product of claim 15, wherein the method further comprises storing the secondary copy of the backup parameters to a standard directory location on the first server.

17. The computer program product of claim 16, wherein the method further comprises:
determining whether the primary copy of the backup parameters are absent from the backup catalog; and
retrieving the secondary copy of the backup parameters from the standard directory location on the first server in response to a determination that the backup parameters are absent from the backup catalog.

18. The computer program product of claim 17, wherein retrieving the secondary copy of the backup parameters from the standard directory location comprises using backup parameters that are most recently stored in the standard directory location and untried at recovering the clone copy to recover the clone copy from the external destination node.

19. The computer program product of claim 15, wherein the method further comprises:
determining whether the clone copy is moved from the location to an alternative location; and
storing a primary copy of the updated backup parameters to the backup catalog in response to a determination that the clone copy is moved from the location to an alternative location.

20. The computer program product of claim 19, wherein the method further comprises storing a secondary copy of the updated backup parameters to a standard directory location.

* * * * *